R. H. UPSON.
KITE BALLOON.
APPLICATION FILED JUNE 20, 1916.

1,385,972.

Patented July 26, 1921.
5 SHEETS—SHEET 1.

Fig. 1.

Witness
C. T. P. Newbold

Inventor
Ralph H. Upson.
By C. T. Faudon
Attorney

Fig. 2.

UNITED STATES PATENT OFFICE.

RALPH H. UPSON, OF AKRON, OHIO, ASSIGNOR TO THE GOODYEAR TIRE AND RUBBER COMPANY, OF AKRON, OHIO, A CORPORATION OF OHIO.

KITE-BALLOON.

1,385,972.　　　　Specification of Letters Patent.　　Patented July 26, 1921.

Application filed June 20, 1916.　Serial No. 104,691.

*To all whom it may concern:*

Be it known that I, RALPH H. UPSON, a citizen of the United States, residing at Akron, in the county of Summit and State of Ohio, have invented new and useful Improvements in Kite-Balloons.

My present invention relates to improvements in that type of captive balloon known as the kite balloon, so called because its normal position in the air presents its under surface to the buoyant force of the wind and also because of its equipment with a stabilizing tail adapted to head the balloon directly into the wind, and to render it stable in this state while tethered to the ground, in order that accurate observations of a military or meteorological nature may be made from the balloon under the most favorable conditions.

Modern balloons of this type are usually provided with a self-contained ballonnet or air chamber, which is open to the atmosphere but is separated from the gas chamber of the balloon proper by a flexible partition or diaphragm. Thus, the volume of the gas compartment may be varied automatically to correspond to changes in volume of the contained gas by filling the ballonnet with air or emptying the air therefrom for such filling and emptying periods will be respectively accompanied by such displacements or shiftings of the diaphragm, as are necessary to effect the required increase or decrease in the volume of the gas chamber. A well known type of kite balloon employs a torus-like excrescence having a funnel mouth opening into the wind and has a similar funnel leading from the torus into the balloon body so that both torus and ballonnet may be filled by wind pressure. The chief function of such a torus as heretofore employed is to act as a rudder in insuring stability of the balloon in the wind, but it is also of use in serving as an exhaust chamber for air expelled from the ballonnet.

By my present invention, however, the old toric protuberance, which depends from the tail of the balloon, is dispensed with and its principal function, which is as stated, to prevent yawing is delegated to a new element, a keel. In combination with the keel, I provide a funnel, which depends from the balloon at the tail portion thereof and is in direct communication with the ballonnet through an air inlet valve. The chief function of this funnel is to supply the ballonnet with air but it also serves to supplement the stabilizing action of the keel to a certain extent.

As a principal object, accordingly, this invention contemplates the provision of a balloon which is equipped with a dependent funnel opening into the wind and provided with valve means automatically regulating the admission of air thereinto as required by variations in the expansion or contraction of the gas volume within the main envelop of the balloon.

An object of coördinate importance is the provision of a stabilizing keel rudder or fin arranged upon the under surface of the balloon for conjunctive employment with the dependent funnel in heading the balloon into the wind.

A further object which is a feature of the present invention resides in the provision of tail cups adapted to be strung out in series to form the balance tail of the balloon in such a manner that a number of tail cup units is concentrated upon the stabilizing keel to maintain the latter desirably taut and therefore obviate the necessity for the use of extraneous stiffening means for this purpose.

It is an additional object of the present invention to equip my balloon with lateral fins serving as additional stabilizing elements and also to increase the lift of the balloon, these surfaces being given an angle of incidence corresponding to that of the balloon belly when presented to the wind.

It is also an object of my invention to provide an improved suspension tackle for the observation car or basket, such tackle permitting the shifting of the car either longitudinally of the balloon or vertically with respect thereto and by a single operator.

Still further betterments put into effect by this invention are to be discovered in the specified construction of valves for both the gas and air compartments of the balloon and in the various valve connections or adjuncts thereof, which accomplish that automatic control of pressures recognized as a primarily important desideratum in the art.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts.

Figure 1:
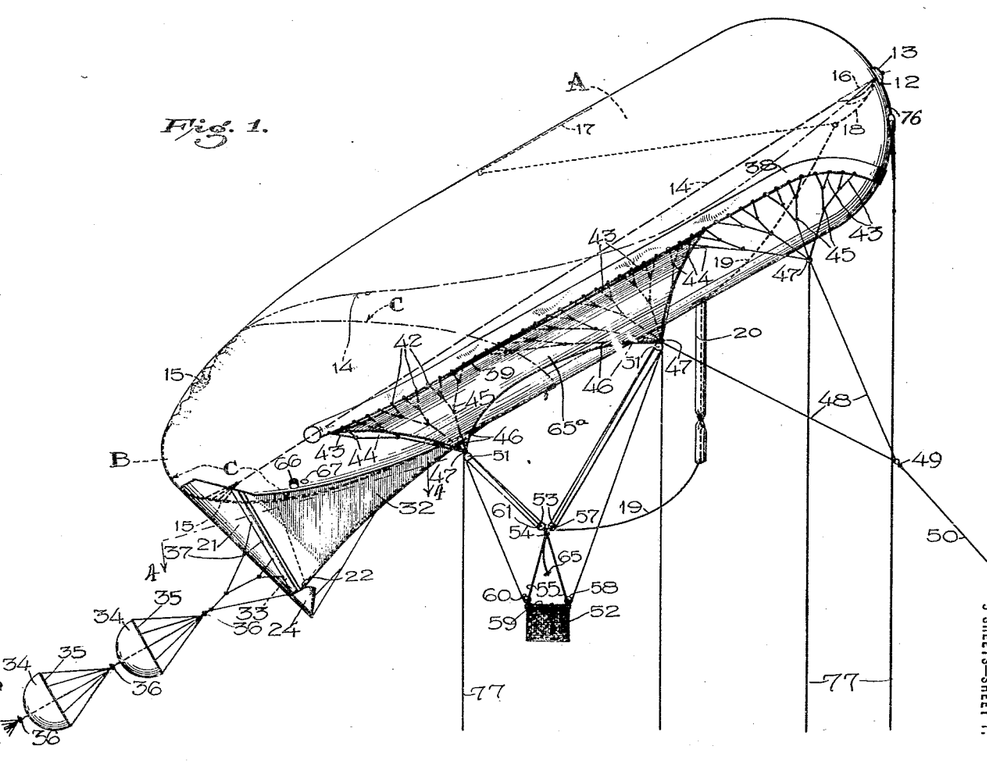
Figure 1 is a side elevation of one of the preferred embodiments of my present invention in kite balloons.
Figure 2:
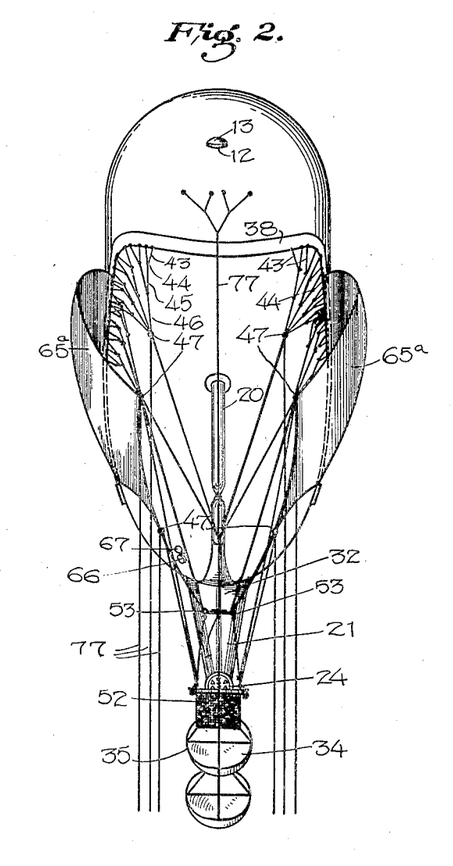
Fig. 2 is a front elevation of the balloon of this invention under actual service conditions.

The major constructional outlines of my kite balloon, reference being had to the form of Fig. 1 for the present, depart from well known practice in the art, in that the balloon envelop as a whole is unsymmetrically shaped fore and aft, being provided with a hemispherical head or nose and a cylindrical body section tapering into an ellipsoidal tail. This constitutes a streamline formation which is distinctly advantageous. The envelop is subdivided into two compartments, the forward or main compartment being the gas chamber A while an air compartment B or ballonnet is provided in the tail by a fabric diaphragm C, which is illustrated by dotted lines in Fig. 1 in its uninflated condition and by the broken lines of the same figure in its position when inflated to compress a diminished body of gas within the chamber A. At the nose of the balloon there is provided the usual gas valve aperture, which is reinforced preferably by a soft felt annulus, fitting this aperture to provide a leak-tight joint 12 for the gas valve 13, which latter may be constructed after any approved model.

In order to insure against a dangerous over-inflation of the gas bag A a control cord or cable 14 extends the interior length of the balloon to an anchoring patch 15 cemented or otherwise fastened to the flexible partition C. When the gas chamber has been filled to the desired point of inflation the pressure upon the diaphragm C, will be such as to belly it away from the nose of the balloon, consequently exerting a pull upon the cord 14 sufficient to open the gas valve and permit the excess gas to escape. Since the length of the cord cannot be calculated to such exact measurements as are required, owing to the sag of the line and other conditions affecting its delicate function, the adjusting wire 16 or its equivalent must be employed to effect the required refinement of this cord length, in the manner which will be understood after an inspection of Fig. 1. In addition to this automatic checking of gas pressures within the main envelop, the usual rip panel 17 with its auxiliary connection 18 to the gas valve is provided for emergency use, the panel cord 19 exiting from the envelop through the dependent filling neck 20 to terminate within the operator's car.

Depending from the tail of the craft is a funnel-shaped air inlet neck 21 which is in communication with the ballonnet B as distinguished from the gas chamber of the balloon.

Figures 4, 5, 6, 7, 8, 9, 10:
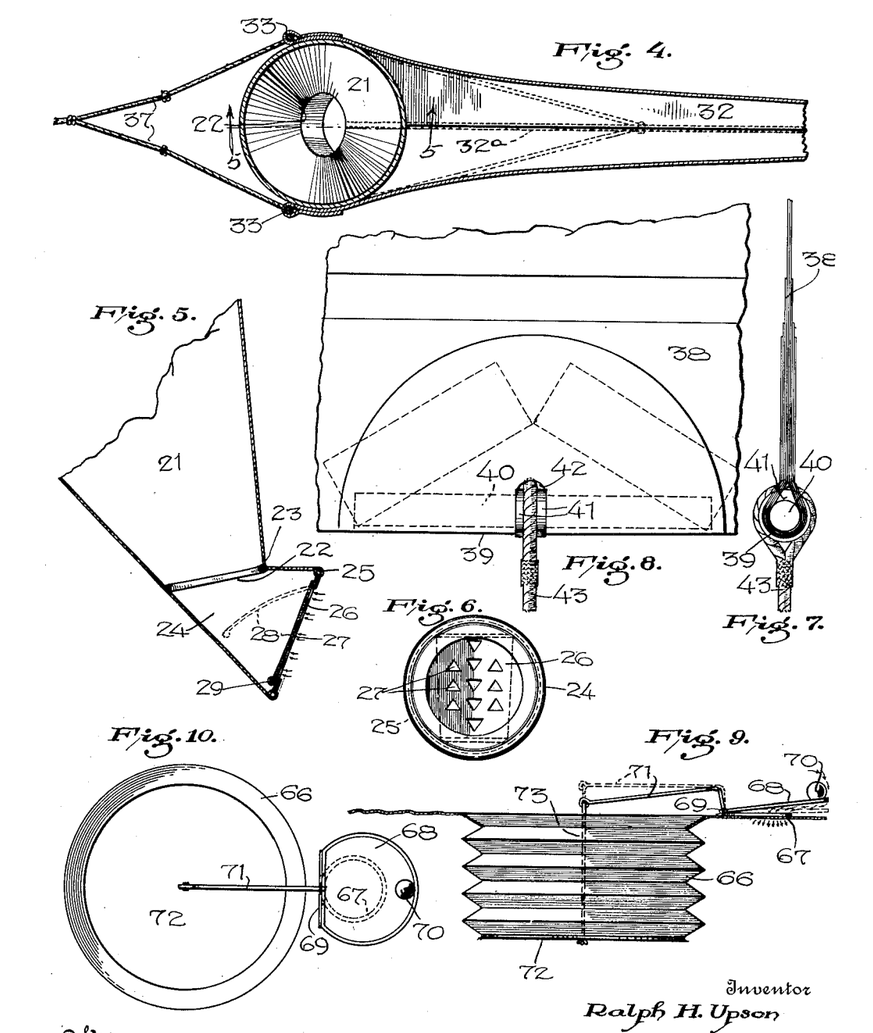
Fig. 4 is a sectional view taken on line 4—4 of Fig. 1.
Fig. 5 is a sectional view taken on line 5—5 of Fig. 4.
Fig. 6 is a detail view in elevation of the air inlet provided with the funnel of Figs. 4 and 5.
Fig. 7 is an end view of the suspension means fastening to the balloon envelops for the support of the observation car.
Fig. 8 is a side elevational view of the suspension means of Fig. 7.
Fig. 9 is an enlarged detail of the exit valve for the ballonnet.
Fig. 10 is a plan of the same valve.

This neck is constructed of fabric similar to that of the main envelop and has its lower open mouth 22 maintained in a distended position by means of the wire annulus 23 (see Fig. 5). Depending in turn from the neck 21 is the air valve inlet 24 whose open mouth is also stiffened by means of the metal ring or annulus 25. Figs. 5 and 6 illustrate the details of this inlet valve, which consists simply of a sheet of fabric 26 stretched over the annulus 25 and provided with special inlets 27, designed to weaken the sheet as little as possible. Cemented at the top on the inner face of the sheet 26 is a fabric flap 28 adapted to entirely cover the openings 27 and having its lower end reinforced by a solid member 29 of wire or any equally rigid material.

It has been found by experience that a fabric flap valve of this character offers the least possible resistance to the entrance of air into the neck 21, but at the same time effecting a positive prevention of the escape of the admitted air, when the pressure interiorly of the neck is sufficient to close the flap 28 against the perforated sheet 26.

In Figs. 1 and 4, are disclosed the fin means or keel employed to insure lateral stability of the balloon. These fins, indicated at 32, are triangular and extend forwardly from the neck 21 to a junction with the main envelop, being lapped over sticks 33 and subsequently stitched or cemented to the inlet funnel. These fins function not only as stationary rudders which tend to point the nose of the balloon into the wind but are also largely instrumental in overcoming the inherent tendencies of the captive balloon to yawing and rolling. As will be seen on reference to Fig. 4 the fins 32 are curved both longitudinally and transversely in such manner that each fin presents a concavity to the wind which acts somewhat as a retaining pocket therefor, an improvement over the convexity of the previously used torus employed by prior types.

Instability due to pitching is overcome by the employment of tail cups 34 which function additionally to dampen or check all of the oscillations or vibrations resulting from movements of the balloon about its center of gravity.

Each of these cups is hemispherical or otherwise concave to the wind and formed of fabric stretched upon a wire hoop 35. Support wires run from the hook 35 to a toggle 36 situated on the axis of the cup. A series of these cups, of a number to be determined upon in accordance with the conditions governing the ascent of the balloon, are fastened by flexible yokes 37 to the sticks 33 maintained by the keel fin 32 of the balloon. I have found that the rearward pull of the tail cups upon the fins 32 will serve to maintain the latter in the condition of tautness required for the most efficient service, without need of stiffening the fins and so increasing their weight. A flexible member, such as the rope 32ª, however, may be employed along the lower edges of the fins in order to distribute the pull of the tail cups along the length of the fins.

It still remains to describe the means of suspension provided for the pilot's basket. A broad fabric band or belt 38 either integral with the envelop or subsequently attached thereto encircles the fore and amidship portions of the main balloon somewhat below the longitudinal axis of the craft. This belt comprises several plies of fabric as well illustrated in Figs. 7 and 8, the bight portions 39 of the fabric plies depending outwardly for the reception of suitable suspension bars 40 which are thus alined to the body of the balloon in accordance with the course of the belt.

Each of these suspension bars 40 is provided with a pair of spaced shoulders 41 at it medial part (see Fig. 6), such shoulders projecting from the belt through suitable openings 42 formed in the bight edge 39 thereof. Looped over each bar and spliced between the spaced shoulders thereof is a suspension cable 43, the cables of adjacent bars being spliced in pairs at points 44, a short distance below the free bight edge of the belt. The adjacent single ropes continuing below the points 44 are again spliced in pairs at points 45, determining continuing suspension lines 46 depending therefrom. Thus, each of the lines 46 has a four point connection with the fabric belt, and through an equal number of separate bars 40, which is an effective means of distributing suspension strains upon the envelop.

The achieved suspension lines 46 are grouped toward three points of concentration on each side of the balloon, rings 47 being situated at these points to collect the various strands 46 radiating therefrom back to the suspension belt 38. From the foremost two rings 47 upon each side of the balloon, lead off the cables 48 which are concentrated by a swivel block connection 49 into the single rope 50 continuing therefrom. It is by means of the rope or cable 50 that the balloon is tethered while on observation duty and is let out or reeled in at the beginning or conclusion of such service.

Figure 13:
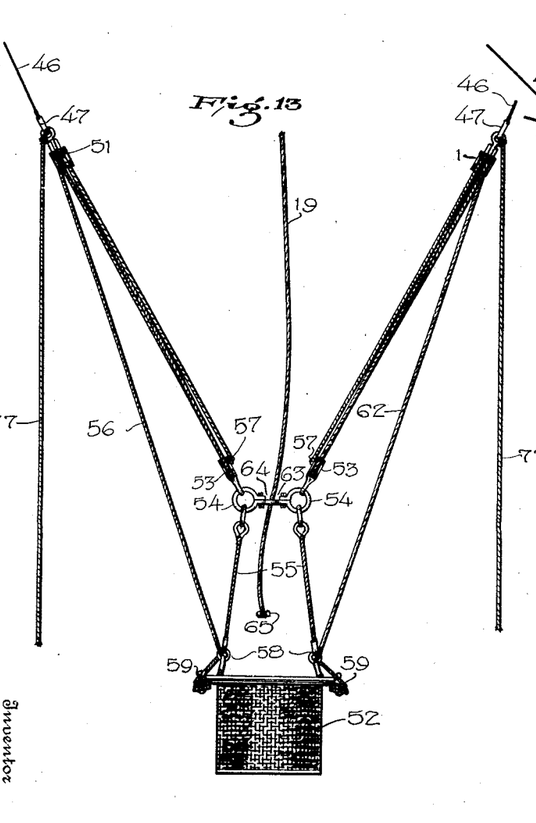
Fig. 13 is a front elevational view of the observation car or basket illustrating the adjustable means of suspension therefor.
Figure 14:
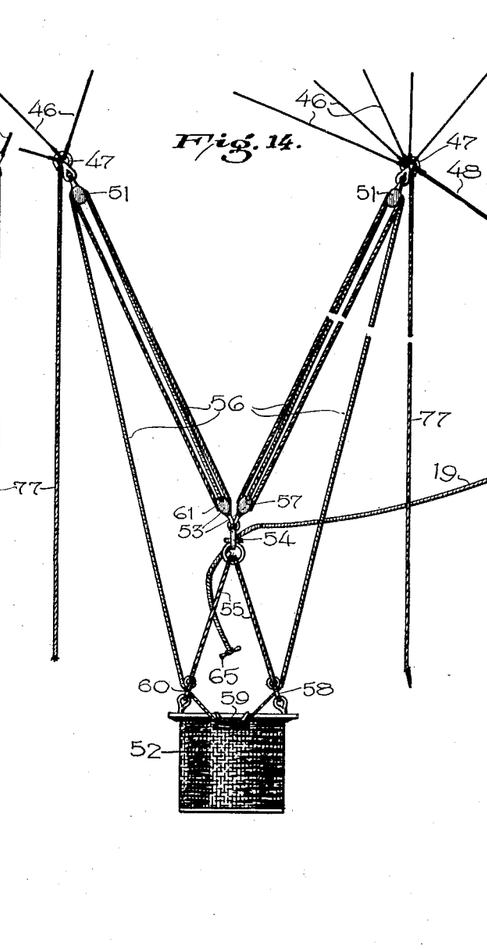
Fig. 14 is a side view of the basket and its adjustable suspension.

From the central and rearmost points of suspension 47, upon each side of the balloon, are strung the double pulleys 51 which determine a four point suspension for the pilot's car or basket 52. Reference being now had to Figs. 13 and 14 in particular, it will be observed that a separate, continuous rope is run over the pulleys of each lateral pair to single pulleys 53 arranged in pairs upon transversely alined rings 54. From these last named rings the car 52 is swung through the medium of the non-adjustable cables 55, which are provided with suitable terminal fastenings to the rings and basket respectively.

As has been stated, each lateral pair of the double pulleys 51 is grouped with a lateral pair of the single pulleys 53 for the leading of a single continuous control line thereover for regulation of the basket suspension. Fig. 14 being a side elevation of the pilot's car, illustrates one of these lateral groups of double and single pulleys, showing the rope or cable 56 as it is led thereover. Considering the cable 56 to be attached to the right hand pulley 53 at the point 57, it may be said to run from thence over the right hand pulley 51; thence back to the first pulley 53; thence again for a second loop over the pulley 51; and thence through a running ring 58 upon the basket to an intermediate looping or reeling upon the fixed cleat 59. Continuing from this cleat, the free end of the cable 56 is carried through an opposite running ring 60 and thence through a reversed looping over the left hand pulleys 51 and 53 to a similar termination upon the left hand pulley 53 at the point 61. The lateral group of pulleys 51 and 53 upon the opposite side of the basket 52 is provided with a running flexible connection 62 similar in all respects to that described in connection with the first mentioned group.

It requires no detailed explanation of this form of suspension for recognition of the fact that a single occupant can readily control the position of the basket both longitudinally and vertically with respect to the gas envelop. Manipulation of the forward portions of each rope 56 and 62 simultaneously will pull the car toward the fore portion of the craft, while progression rearwardly is as easily attained by operation of the rearmost portions of these two suspension cables simultaneously, the bight portions of the cables being slacked off their cleats during the operation. To raise or lower the car, the bight portions of the suspension cables 56 and 62 are released from their cleats 59 and simultaneously wound up or let out, as the case may be, being replaced upon their cleats at the conclusion of the operation when reaching the desired height. A suspension of this type obviously serves to dampen the swaying of the basket which was a well recognized hindrance to proper observational work in captive balloons of the older types.

The emergency cord 19 is led freely through the filling neck 20 into the basket 52 by way of the ring sleeve 63, which is carried upon a bar 64 connecting the main suspension rings 54 on opposite sides of, and above, the basket. A toggle 65 maintained upon the terminus of the rope 19 after the latter has been passed through the coupler 63, prevents the operating end of this valve cord from slipping out of the pilot's reach.

Elongated side fins 65ª, of the shape shown in Fig. 1, have their bases stitched to opposite amidships portions of the balloon immediately below the suspension band 38 and arch outwardly to points of attachment to the forward and rear pairs of rings 47. These fins differ from the side fins customarily employed for the reason that they partake of both a yaw-preventing and pitch-preventing nature, attained by the fastening arrangement giving the side fins substantially the angle of the balloon. The usual arrangement of these fins is one of almost entirely horizontal concavity.

Attention is now directed to the ballonnet air valve which is illustrated in detail in Figs. 9 and 10. This valve consists simply of an accordion sleeve 66, which communicates with the interior of the ballonnet and forms an expansion chamber therefor, and of a valve opening 67 arranged in proximity to this sleeve. A rigid valve plate 68 is pivotally mounted as indicated at 69 and adapted to cover the opening 67. Upon the portion of the plate opposite its pivotal axis is arranged a weight 70 while an operating lever arm 71 projects above and at right angles to the axis 69 and extends over the expansion sleeve 66, to the closed face 72 of which it is connected by flexible means 73.

It should be apparent that expansion of the sleeve 66 due to the attainment of such predetermined pressure within the ballonnet as is capable of overcoming the weight of the counter-balance 70, will unseat the valve plate 68 and permit the pressure to be dissipated by escape of air through the opening 67, until such time as the pressure within the expansion chamber 66 is reduced to that point at which it is no longer able to overcome the effect of the counterbalance, which will then seat the valve plate upon the opening and prevent the further escape of the air contents of the ballonnet.

The description of the various details of this form of my invention may be concluded by directing attention to the fact that the pulleys 51 are secured in direct proximity to suspension rings 47, which prevents the adjusting ropes 56 and 62 from being subject to any twisting or fouling action; and by mention of the fact that from the various rings 47 and from a nose patch 76 a suitable number of maneuvering ropes 77 are permitted to trail freely to allow control of the balloon by pedestrian attendants when the balloon is in proximity to the ground.

Figures 3, 11, 12:
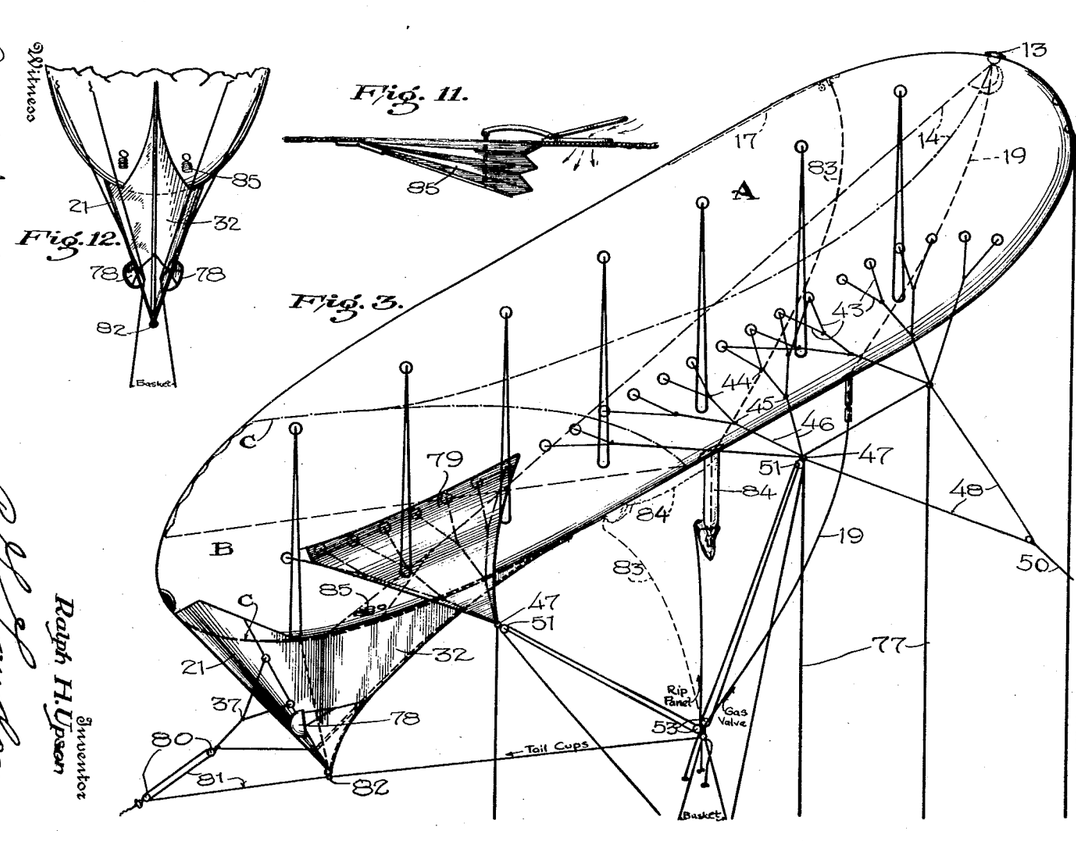
Fig. 3 is a side elevation of a form of balloon also comprehended by this invention and embodying some modifications of the structure of Figs. 1 and 2.
Fig. 11 illustrates a modified form of an exit valve.
Fig. 12 is a front view of the funnel employed in my modified balloon.

A modified type of balloon such as is illustrated in Figs. 3 and 12 varies in but slight degree from the balloon disclosed in the foregoing. One of the chief differences is that in place of the funnel mouth 24 there has been provided a pair of open pockets 78 which project laterally from the dependent funnel and serve to conduct the air into the ballonnet in the performance of functions similar to those already ascribed to the funnels 24. Another difference is that the triangular fin 79 has been provided in place of the elongated side fin 65ª of the first discussed form, in order to decrease the drift of the balloon. A further important feature is shown in the adjustable mounting for the series of tail cups, this mounting including the pulleys 80 and the line 81 which is looped about the pair of pulleys and led through the eye or pulley 82, dependent from the funnel of the balloon, to a termination within the basket where it may be readily reached by the operator. This adjustability of the balancing tail for the balloon is one of the important features of control.

In the balloon of Fig. 3 the gas valve 13 is placed at the highest portion of the envelop instead of on the longitudinal axis thereof, thus giving the cords 14 and 19 which connect respectively to the ballonnet diaphragm C and to the basket a more direct pull along their length, obviating some of the sag in the line. With respect to the gas cord 19 it will be apparent from an inspection of this figure that it has been separated from the rip cord 83, as is necessary should the craft at any time become a free balloon, such as by the parting of the cable 50. Normally the appendix 84 through which the cord 83 passes from the rip panel to the basket is tied back against the belly of the balloon in the manner shown in the dotted lines, a breakable cord being employed for this purpose. A second breakable cord also secures the mouth of the appendix back upon its body. When it is desired to release the appendix the first jerk upon the cord terminating in the basket of the balloon releases the appendix by breaking the first cord, while a second jerk releases the mouth of the appendix in order that the rip cord may be manipulated as required.

The exit valve for the ballonnet has also been given a variant form in this modification of my balloon, reference being now had to Fig. 11 in which it will be seen that the accordion shape of valve shown in the balloon first discussed has been changed for a bellows shape of valve 85 operating in substantially the same manner. In the modified form of balloon the belt suspension has been dispensed with in favor of individual patch suspension shown in Fig. 3. The various modifications of detail, however, which have thus been grouped on a single balloon are merely illustrative of some of the alterations to which the design of my balloon may be subjected without in reality departing from the spirit of the invention.

From the foregoing description of the elements, which I have embodied in the types of kite balloon presented herewith, it may be concluded with but brief discussion that I have attained the objects of this invention as previously set forth.

The balloon having been inflated and permitted to rise after the observers have taken their stand within the car 52, the tethering cable 50 is paid out until the craft has attained the desired height. If the sun be shining, the gas in compartment A will be expanded by the heat, a result also effected by the increase in altitude, thus pressing the diaphragm C rearwardly, which will open the gas valve 13 until the pressures within the balloon have adjusted themselves. If the sun becomes obscured, or if the balloon descend the volume of gas will contract and its density will increase so that it must necessarily be compressed by the ballonnet diaphragm in order to maintain such a pressure that wrinkling of the gas envelop will be prevented. Air will now freely enter through the flap valve 28 and pass upwardly through the cone 21 into the ballonnet filling out the member and thereby compressing the gas to the extent required to maintain the envelop in its normal conformation. Subsequent expansion of the gas volume will act upon the diaphragm in such manner that the air valve 66 will be employed as an expansion chamber for the ballonnet, thus unseating the valve plate 68 in the manner already described to relieve the pressure in the ballonnet. It will be observed that the foregoing functions of the various air and gas valves are entirely automatic and require no manual superintendence.

It has also been set forth previously in what manner the stability of the balloon is enhanced by employing the fins 32 and 65ª to prevent yawing, pitching and rolling of the craft, while relying upon the tail cups 33 to dampen or check all of these oscillations of instability. The tail cups also coöperate with the fins 32 in the performance of the latter's functions, both directly by the dampening effect above described, and indirectly by exertion of a rearward pull upon the fins to keep them taut.

One factor of great importance in achieving maximum stability for the balloon is the determination of the correct floating attitude thereof. Kite balloons uniformly ride with their nose at a higher elevation than the tail, yet the angle of inclination made by the longitudinal axis of the craft with the horizontal is one capable of much variation, and is determined, other things being equal, by the suspension of the pilot's basket. Since this may be varied at will by the operator while in the air, it is apparent that this important factor of mechanical stability and climbing powers is capable of adjustment in my balloon to meet varying conditions of gas volume, basket load, and wind force, in supplementation of the inherent stability of the craft as provided by the ballonnet, the stabilizing keel fins, side fins and tail cups.

While in the foregoing, however, there has thus been illustrated in the drawings and described in the specification, such arrangement and combination of elements as constitutes the preferred embodiment of my invention in its present state of reduction to practice, I desire to emphasize the fact that such variant expedients may be resorted to in later adaptations of the device as shall fall within the scope of the appended claims.

What I claim is:

1. In a kite-balloon, an envelop having separate gas and air compartments, a substantially conical inlet neck flexibly dependent from the air compartment, and a keel extending between said inlet neck and the balloon envelop, whereby said inlet neck is anchored in a substantially fixed position.

2. The combination with a balloon envelop provided with a gas chamber and a diaphragm forming a ballonnet within said envelop, of a substantially conical casing dependent from the envelop and in communication with said ballonnet; an inlet mouth provided for said substantially conical casing; and an outlet for the ballonnet leading from the said envelop.

3. The combination with a balloon envelop provided with a gas chamber and a diaphragm forming a ballonnet within said envelop, of an inlet cone communicating with said ballonnet, adjacent the extreme rear of the balloon; an expansible member located exteriorly of the cone and defining a chamber also communicating with said ballonnet; and an outlet for the ballonnet comprising a hinged flap valve adapted to be automatically controlled by said expansible member.

4. In a kite-balloon the combination with a gas chamber and associated ballonnet, of an inlet cone dependent from the balloon and in communication with the ballonnet; and a stabilizing fin extending between said cone and the balloon proper.

5. In a balloon, a gas chamber and a ballonnet; an inlet cone depending from the ballonnet; and stabilizing fins secured commonly to the balloon and diverging therefrom for separate attachment to said inlet cone.

6. In a balloon, an envelop provided with a gas chamber and a ballonnet; and stabilizing means dependent from the envelop, said stabilizing means including an inlet cone in communication with the ballonnet to maintain the equilibrium of the balloon by automatic regulation of pressures within said gas chamber; and a vertical keel having its upper and rear edges connected to the balloon envelop and inlet cone respectively, said keel comprising two substantially triangular shaped concave fins diverging from their lower connected juxtaposed edges to their said upper and rear edges.

7. In a balloon, the combination of fabric stabilizing fins dependent from the balloon and tail cups connected to said fins to maintain them taut.

8. In a captive balloon, a stabilizing fin adapted to head the balloon into the wind and tail cups strung rearwardly from said fin and adapted to oppose the wind, when the balloon is headed into the latter, with such force as to stretch the said fin taut.

9. In a captive balloon a combination of a ballonnet, an inlet cone in communication with the latter and dependent from the balloon; longitudinal fins connecting said inlet cone with the balloon; and tail cups strung out rearwardly from said balloon and adapted to tauten said fins.

10. The combination with a balloon including a gas compartment and an air ballonnet therein, of a substantially conical flexible air inlet depending from the rear portion of the balloon and communicating with the air ballonnet, a substantially vertical keel connected at its top and rear edges to the balloon and the air inlet respectively and in advance of said air inlet, said keel comprising two substantially triangular fins diverging from their lower juxtaposed connected edges to their said upper and rear edges.

11. An adjustable suspension for the passenger car of a balloon including double pulleys swung from below the balloon in pairs; single pulleys grouped in pairs for each corresponding pair of double pulleys; and single continuous suspension cords each of which is adapted to travel over a pair of double and a pair of single pulleys of each group, and suspending said car.

12. In a balloon a fabric belt secured on the surface of the balloon and having a bight edge freely depending therefrom; suspension bars arranged within the bight of said belt and following the course of the latter about the balloon shoulders formed on each of said bars and adapted to project from the belt through the aperture formed in the bight edge thereof; and a suspension cable maintained between the shoulders of each bar, said cables being grouped to common points of suspension from separate bars.

13. The combination with a kite balloon including a gas chamber and an associated ballonnet, of a tubular inlet member depending from the balloon and in communication with the ballonnet, and a stabilizing fin extending forwardly of the inlet tube and connected to the tube and the balloon.

14. In a balloon the combination of an envelop provided with a gas chamber and a ballonnet; a substantially conically shaped casing depending from the envelop at the rear end thereof; an inlet valve housed within the casing and arranged to control admission of air into the balloon; and a vertical fin depending from the belly of the envelop and located in advance of the casing.

15. The combination with a balloon envelop provided with a gas chamber and a diaphragm forming a ballonnet within said envelop, of an air inlet valve for controlling admission of air into the ballonnet; a substantially conical casing housing the said valve and having an inlet mouth at its lower end; and an outlet valve controlling the escape of air from the balloon, said outlet valve being located exteriorly of said casing.

16. In a balloon, an envelop provided with a gas chamber and ballonnet; an inlet valve controlling admission of air into the ballonnet; a substantially conical casing attached to the envelop and forming a housing for an inlet valve, said casing having an inlet mouth at its lower end and being relatively attenuated whereby said air inlet opening at its lower end is disposed considerably below the belly of the envelop; and an air outlet valve for the ballonnet located exteriorly of said casing.

In testimony whereof I have signed my name in the presence of two subscribing witnesses.

RALPH H. UPSON.

Witnesses:
B. J. McDANEL,
LELA WAGNER.